(12) United States Patent
Rohr et al.

(10) Patent No.: US 8,474,446 B1
(45) Date of Patent: Jul. 2, 2013

(54) SOLAR COLLECTOR

(75) Inventors: Robert M. Rohr, Rogersville, MO (US);
Max J. Rohr, Rogersville, MO (US)

(73) Assignee: Caleffi S.p.A., D'Agogna (NO) (IT)

( * ) Notice: Subject to any disclaimer, the term of this patent is extended or adjusted under 35 U.S.C. 154(b) by 372 days.

(21) Appl. No.: 12/729,786

(22) Filed: Mar. 23, 2010

(51) Int. Cl.
*F24J 2/24* (2006.01)

(52) U.S. Cl.
USPC ........... 126/663; 126/623; 126/655; 126/660; 126/661; 126/662; 126/666; 126/668; 126/704; 165/48.2

(58) Field of Classification Search
USPC ................. 126/623, 655, 660–663, 666, 668, 126/704; 165/48.2, 172–176
See application file for complete search history.

(56) References Cited

U.S. PATENT DOCUMENTS

| | | | | |
|---|---|---|---|---|
| 3,194,228 A * | 7/1965 | Amat Bargues | ............... | 126/662 |
| 3,859,980 A * | 1/1975 | Crawford | ....................... | 126/624 |
| 3,902,474 A * | 9/1975 | Pyle | ................. | 126/585 |
| 3,949,732 A * | 4/1976 | Reines | ........................... | 126/597 |
| 3,991,742 A * | 11/1976 | Gerber | ........................ | 126/563 |
| 4,000,850 A * | 1/1977 | Diggs | ........................... | 126/613 |
| 4,020,827 A * | 5/1977 | Broberg | ........................ | 126/696 |
| 4,021,901 A * | 5/1977 | Kleine et al. | ............. | 29/890.042 |
| 4,027,821 A * | 6/1977 | Hayes et al. | .................. | 126/588 |
| 4,046,136 A * | 9/1977 | Izumi et al. | ................... | 126/665 |
| 4,066,121 A * | 1/1978 | Kleine et al. | ................... | 165/170 |
| 4,067,317 A * | 1/1978 | Hubbard | ........................ | 126/664 |
| 4,080,702 A * | 3/1978 | Chatfield et al. | ......... | 29/890.042 |
| 4,082,082 A * | 4/1978 | Harvey | .......................... | 126/665 |
| 4,086,910 A * | 5/1978 | Rowland | ....................... | 126/670 |
| 4,093,024 A * | 6/1978 | Middleton | ..................... | 165/170 |
| 4,099,559 A * | 7/1978 | Butt | ............................... | 165/170 |
| 4,109,711 A * | 8/1978 | Kleine et al. | ................... | 165/170 |
| 4,116,222 A * | 9/1978 | Seifried | ........................ | 126/589 |
| 4,120,351 A * | 10/1978 | Kleine et al. | ................. | 165/170 |
| 4,122,830 A * | 10/1978 | Hapgood | ...................... | 126/640 |
| 4,136,669 A * | 1/1979 | Lane | .............................. | 126/621 |
| 4,149,524 A * | 4/1979 | Severson | ...................... | 126/670 |
| 4,161,809 A * | 7/1979 | Severson | ................. | 29/890.033 |
| 4,168,742 A * | 9/1979 | Kluppel et al. | ............... | 165/114 |
| 4,169,460 A * | 10/1979 | Popovich et al. | ............. | 126/589 |
| 4,170,984 A * | 10/1979 | Scheffee | ........................ | 126/673 |
| 4,178,910 A * | 12/1979 | Gramer et al. | ................ | 126/677 |
| 4,185,616 A * | 1/1980 | Johnson | ......................... | 126/652 |
| 4,186,720 A * | 2/1980 | Schmauder et al. | .......... | 126/667 |
| 4,186,721 A * | 2/1980 | Whitman | ...................... | 126/617 |
| 4,187,901 A * | 2/1980 | Coleman et al. | ................ | 165/47 |
| 4,209,885 A * | 7/1980 | Winter | ..................... | 29/890.042 |
| 4,209,886 A * | 7/1980 | Winter et al. | ............ | 29/890.042 |
| 4,210,127 A * | 7/1980 | Kleine et al. | ................... | 126/670 |
| 4,211,209 A * | 7/1980 | Gay | ............................... | 126/587 |
| 4,211,213 A * | 7/1980 | Nissen et al. | .................. | 126/563 |
| 4,215,675 A * | 8/1980 | Embree | ........................ | 126/661 |

(Continued)

FOREIGN PATENT DOCUMENTS

CA          2412028 A1 *  5/2004

*Primary Examiner* — Kenneth Rinehart
*Assistant Examiner* — Jorge Pereiro
(74) *Attorney, Agent, or Firm* — Boyle Fredrickson, S.C.

(57) ABSTRACT

A solar collector includes a first header, a second header and one or more riser tubes that connect the first header and second header. The solar collector is mounted to a surface, e.g., a roof, such that the headers are substantially parallel to a horizontal axis. The first header is curved so as to define a low point that facilitates drainage of liquid from the solar collector.

10 Claims, 6 Drawing Sheets

U.S. PATENT DOCUMENTS

| | | | | |
|---|---|---|---|---|
| 4,216,764 A * | 8/1980 | Clark | | 126/663 |
| 4,219,011 A * | 8/1980 | Knoos | | 126/666 |
| 4,224,817 A * | 9/1980 | Kleine et al. | | 72/54 |
| 4,227,391 A * | 10/1980 | Belangee | | 72/54 |
| 4,235,287 A * | 11/1980 | Kleine et al. | | 165/170 |
| 4,246,888 A * | 1/1981 | Jarzenbeck, Sr. | | 126/620 |
| D258,232 S * | 2/1981 | Weis | | D13/102 |
| 4,253,491 A * | 3/1981 | Worthen et al. | | 137/601.2 |
| 4,261,330 A * | 4/1981 | Reinisch | | 126/705 |
| 4,280,556 A * | 7/1981 | Cooper | | 165/76 |
| 4,284,062 A * | 8/1981 | Swindle | | 126/587 |
| 4,292,958 A * | 10/1981 | Lee | | 126/664 |
| 4,296,735 A * | 10/1981 | Llorach | | 126/674 |
| 4,300,534 A * | 11/1981 | Bowen | | 126/646 |
| 4,309,987 A * | 1/1982 | Higgins, Jr. | | 126/664 |
| 4,312,325 A * | 1/1982 | Voges et al. | | 126/588 |
| 4,333,448 A * | 6/1982 | Johnson | | 126/714 |
| 4,378,046 A * | 3/1983 | Klinger | | 165/51 |
| 4,407,269 A * | 10/1983 | Hopper | | 126/634 |
| 4,423,718 A * | 1/1984 | Garrison | | 126/655 |
| 4,429,545 A * | 2/1984 | Steinberg | | 62/235.1 |
| 4,519,380 A * | 5/1985 | Laing | | 126/583 |
| 4,527,618 A * | 7/1985 | Fyfe et al. | | 126/635 |
| 5,074,282 A * | 12/1991 | Reed | | 126/588 |
| 6,003,319 A * | 12/1999 | Gilley et al. | | 62/3.7 |
| 7,210,271 B2 * | 5/2007 | Wheeler | | 52/245 |
| 7,604,003 B2 * | 10/2009 | Merrett | | 126/563 |
| 7,900,689 B2 * | 3/2011 | Samuelson et al. | | 165/68 |
| 2001/0042716 A1* | 11/2001 | Iversen et al. | | 210/640 |
| 2005/0145680 A1* | 7/2005 | Travassaros | | 228/183 |
| 2005/0217664 A1* | 10/2005 | Patterson | | 126/634 |
| 2007/0227695 A1* | 10/2007 | Beamer et al. | | 165/76 |
| 2008/0202733 A1* | 8/2008 | Samuelson et al. | | 165/153 |
| 2009/0084430 A1* | 4/2009 | Intrieri et al. | | 136/246 |
| 2009/0250189 A1* | 10/2009 | Soukhojak et al. | | 165/10 |
| 2010/0012307 A1* | 1/2010 | Taras et al. | | 165/177 |
| 2010/0101563 A1* | 4/2010 | Fischer | | 126/651 |
| 2011/0146661 A1* | 6/2011 | Dudas | | 126/575 |
| 2011/0308513 A1* | 12/2011 | Martinez-Val Penalosa | | 126/655 |

* cited by examiner

SOLAR COLLECTOR

BACKGROUND OF THE INVENTION

1. Field of the Invention

The present invention relates in general to the field of solar collector systems. More particularly, the present invention relates to a solar collector that includes a header having a low point that facilitates drainage of liquid. Accordingly, a series of solar collectors may be mounted such that solar collectors are aligned along a horizontal axis.

2. Background

In typical solar collector heating systems, one or more solar collector panels are mounted on a roof or other supporting structure. Each solar panel typically defines an interior and includes a series of fluid conduits or tubes within the interior that circulate a heating medium. In a typical embodiment, the series of conduits includes an upper transverse header, a lower transverse header, and a series of spaced apart longitudinal tubes that extend between the upper and lower headers. The system is constructed such that a fluid, which is typically a liquid such as water or glycol, is introduced into the solar panel at an inlet in communication with the upper header, and then flows through the longitudinal tubes to the lower header for discharge through an outlet in communication with the lower header.

Because a roof is usually pitched or angled, the liquid that is used in the solar collector system will generally flow downwardly from the upper header through the longitudinal tubes to the lower header under the force of gravity when the system is not in operation, e.g., when the pump has been deactivated, so as to drain the liquid from the solar collector panels. In order to drain the liquid from an array of solar panels, the liquid must be directed to a drainage port that is positioned so as to define the lowermost point of the panel array. Because the upper and lower headers are oriented parallel to the end walls of the panel, the method that is currently used is to mount the solar panels to the roof such that the solar panels are angled with respect to the horizontal direction. In this manner, the discharge outlet of the endmost panel defines the lowermost point of the array, and liquid from all of the panels is directed into the lower header of the lowermost panel and is discharged from the discharge outlet of the lowermost panel. While this construction is functional, it is undesirable because the resulting structure is skewed relative to the roof and causes a displeasing, incongruous aesthetic effect, particularly in instances where a large number of solar panels are incorporated into a system. Moreover, installation of existing systems can be tedious and difficult because such systems require unique and non-uniform measurements and supporting structure in order to properly position each solar panel of the array. Accordingly, installation of existing systems is tedious and time consuming.

What is needed is a solar collector that is constructed so that liquid naturally flows out of the solar collector without the need to angle the solar collector panel with respect to a horizontal axis. Thus, the solar collector can be aligned with a horizontal axis, which offers a more aesthetically pleasing appearance and which also reduces the complication, cost and time involved with installing a solar collector system.

SUMMARY AND OBJECTS OF THE INVENTION

By way of summary, the present invention is directed to solar collector or panel that is used in a solar collector system. One object of the invention is to provide a solar collector that may be mounted such that it aligns with a horizontal axis, resulting in an aesthetically pleasing appearance. Another object of the invention is to provide a solar collector that has one or more of the characteristics discussed above but which is relatively simple and inexpensive to manufacture and assemble using a minimum of equipment.

In accordance with one aspect of the invention, a solar collector includes a liquid circulation arrangement having an arcuate lower header that defines a low point. There is a port near the low point that allows fluid to exit the solar collector. The solar collector further includes an upper header and a longitudinal riser tube, which may be one of a group of riser tubes, connecting the upper header and the lower header. Additionally, the solar collector may be mounted such that the headers of the solar collector are substantially parallel to a horizontal axis. In other words, for example, the solar collector is not rotated or tilted with respect to an edge of the roof (which is typically horizontal).

In accordance with another aspect of the invention, a solar collector includes a first header having a low point. There is a port near the low point of the first header, which may be connected to a port that allows for liquid to exit the solar collector. The solar collector further includes one or more longitudinal riser tubes connecting the first header to a second header. The solar collector may be mounted so the first and second headers generally extend along a horizontal axis.

In accordance with a further aspect of the invention, a solar collector includes a first header, a second header, and a plurality of longitudinal riser tubes communicating with the first header and the second header. The solar collector is positioned such that the first and second headers extend generally along a horizontal axis. Further, the solar collector may be one of a plurality of solar collectors, with the first and second headers of each solar collector respectively aligned along the horizontal axis.

In accordance with another aspect of the invention, a method of installing a solar collector includes the steps of providing a solar collector including a first header having a low point, a second header, and one or more longitudinal riser tubes that communicate with the first header and the second header. The method further includes the step of positioning the solar collector such that the first header is substantially parallel to a horizontal axis.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings in which like reference numerals represent like parts throughout.

In the drawings.

DESCRIPTION OF PREFERRED EMBODIMENTS

The present invention and the various features and advantageous details thereof are explained more fully with reference to the non-limiting embodiments described in detail in the following description.

1. System Overview

Figure 5:
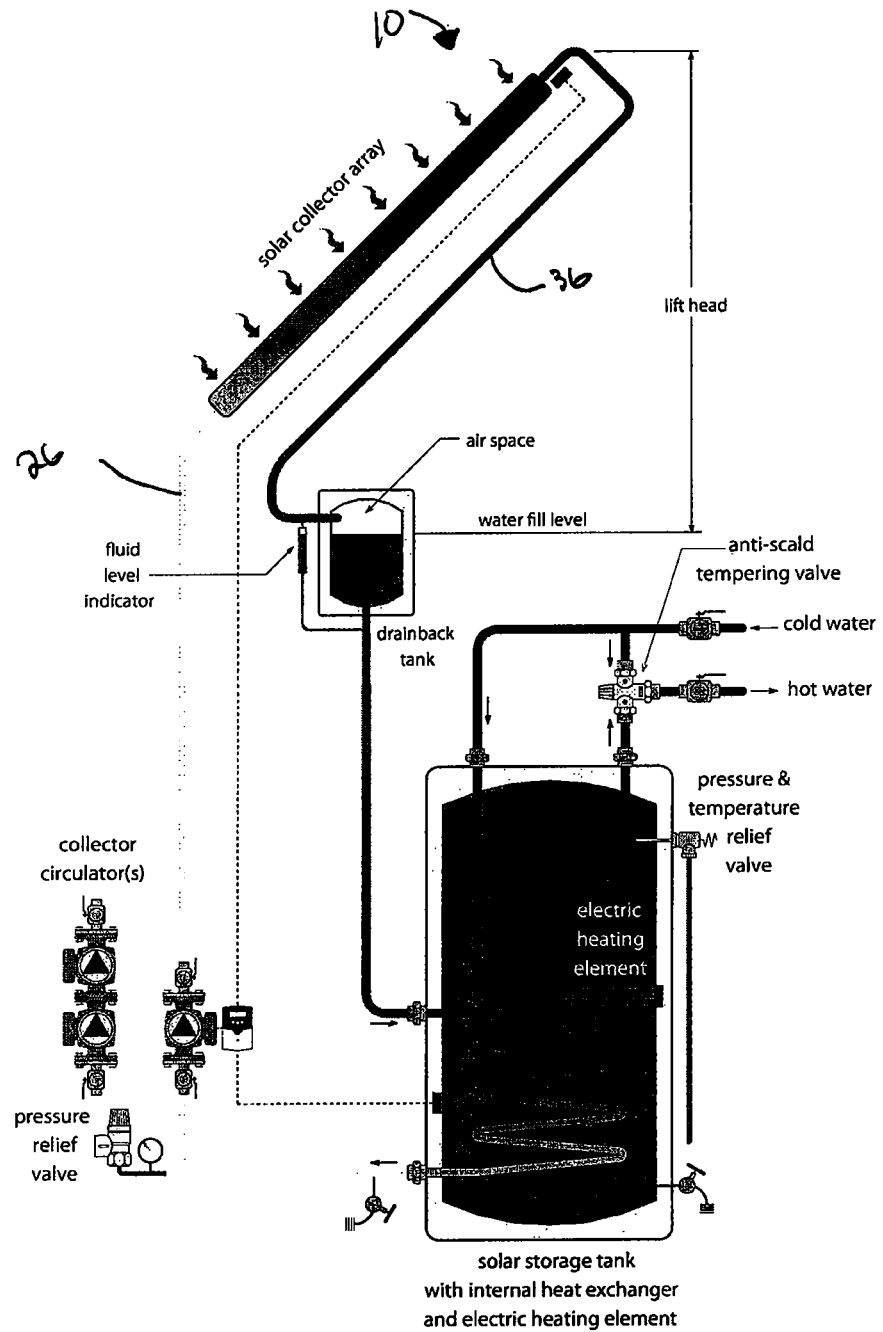
FIG. 5 shows a schematic of a drain back solar collection system with which the solar collector of the present invention may be used.
Figure 6:
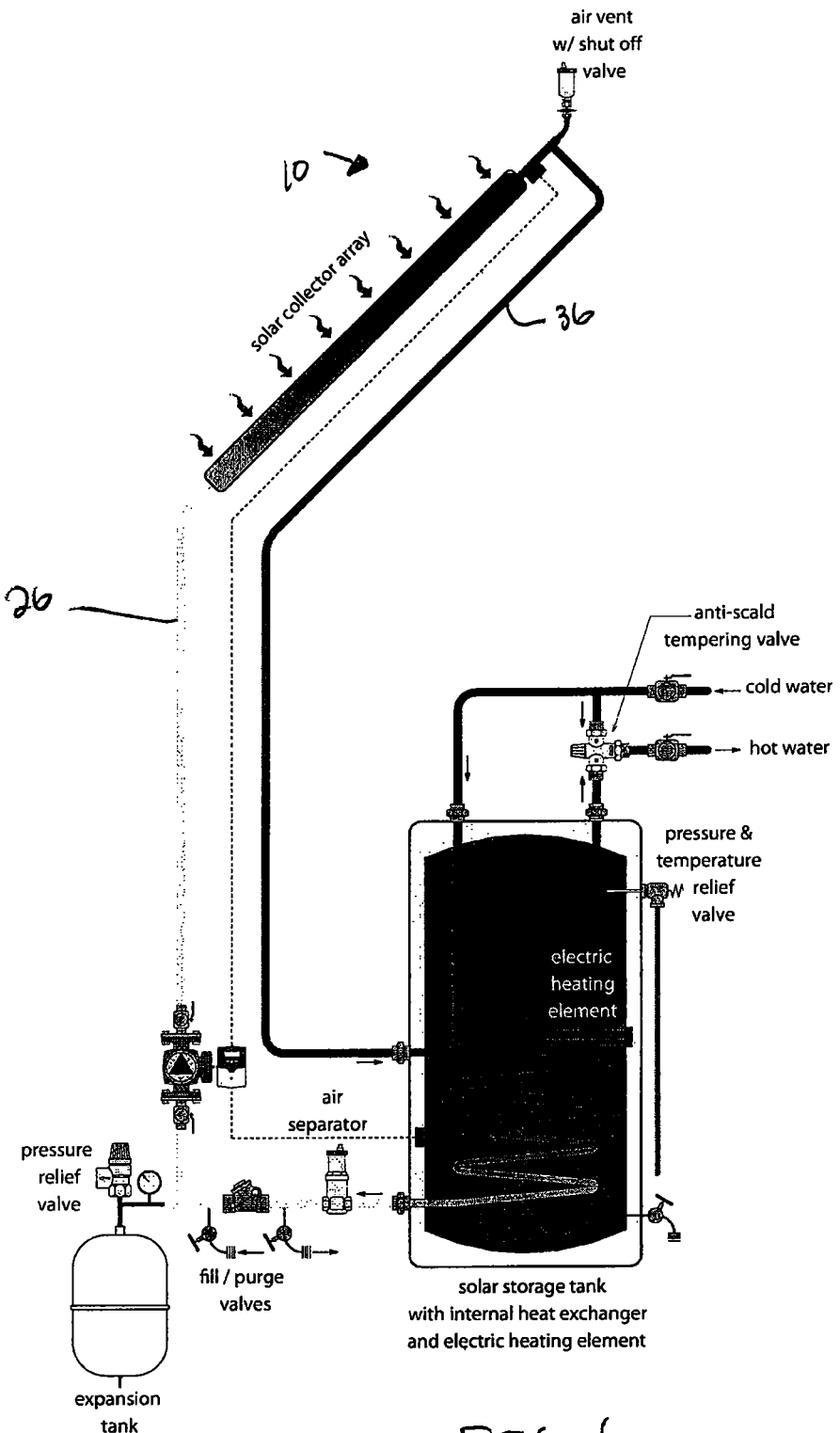
FIG. 6 shows a schematic of a pressurized solar collection system with which the solar collector of the present invention may be used.

A solar panel or collector 10 of the present invention may be used in conjunction with a solar collector system. Examples of systems are shown in FIGS. 5 and 6. The system of FIG. 5 is a drain back system, whereas the system of FIG. 6 is a pressurized system. Generally speaking, the solar collector 10 is plumbed into a liquid circulation system that heats a fluid medium that flows through the solar collector 10, which in turn is supplied to a heat exchanger or other device. The heat from the heated medium, which is typically a liquid such as water or glycol, is then typically used to heat water or air that is used in a building, in a manner as is known.

2. Detailed Description of Preferred Embodiments

The solar collector 10 of the present invention may be used in conjunction with fluid circulation system in a manner as is known. The solar collector 10 is typically placed on a surface that is angled, for example a roof or other supporting structure, so that exposure of the solar panels to sun's rays is maximized. In another example, the solar collector 10 may be placed on an angled platform mounted on the ground or on a flat roof. It is understood that the solar collector 10 may be placed on any surface as desired.

During operation of the solar collector system, liquid flows through the solar collector 10, which includes a series of tube components such as a first transverse header 20, a second transverse header 30, and a series of longitudinal riser tubes 40. As shown in the systems of FIGS. 5 and 6, liquid is pumped into the solar collector 10, which includes a conventional solar ray collection system that heats the liquid in the solar collector 10, and the heated liquid is returned to the fluid circulation system to be used as desired, e.g., to heat water in a hot water heater.

Figure 1:
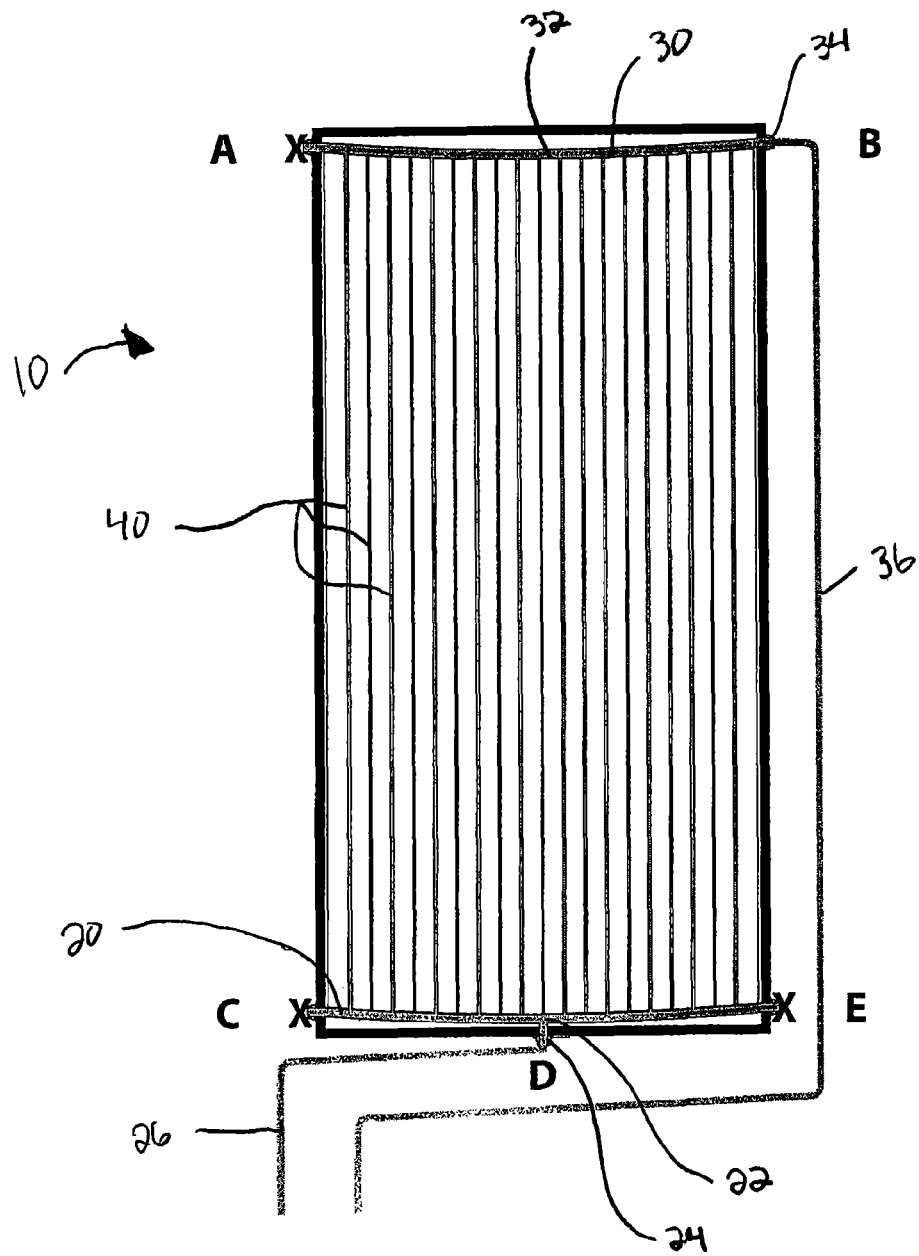
FIG. 1 is a top plan view of one embodiment of a solar collector constructed in accordance with the present invention.
Figure 3:
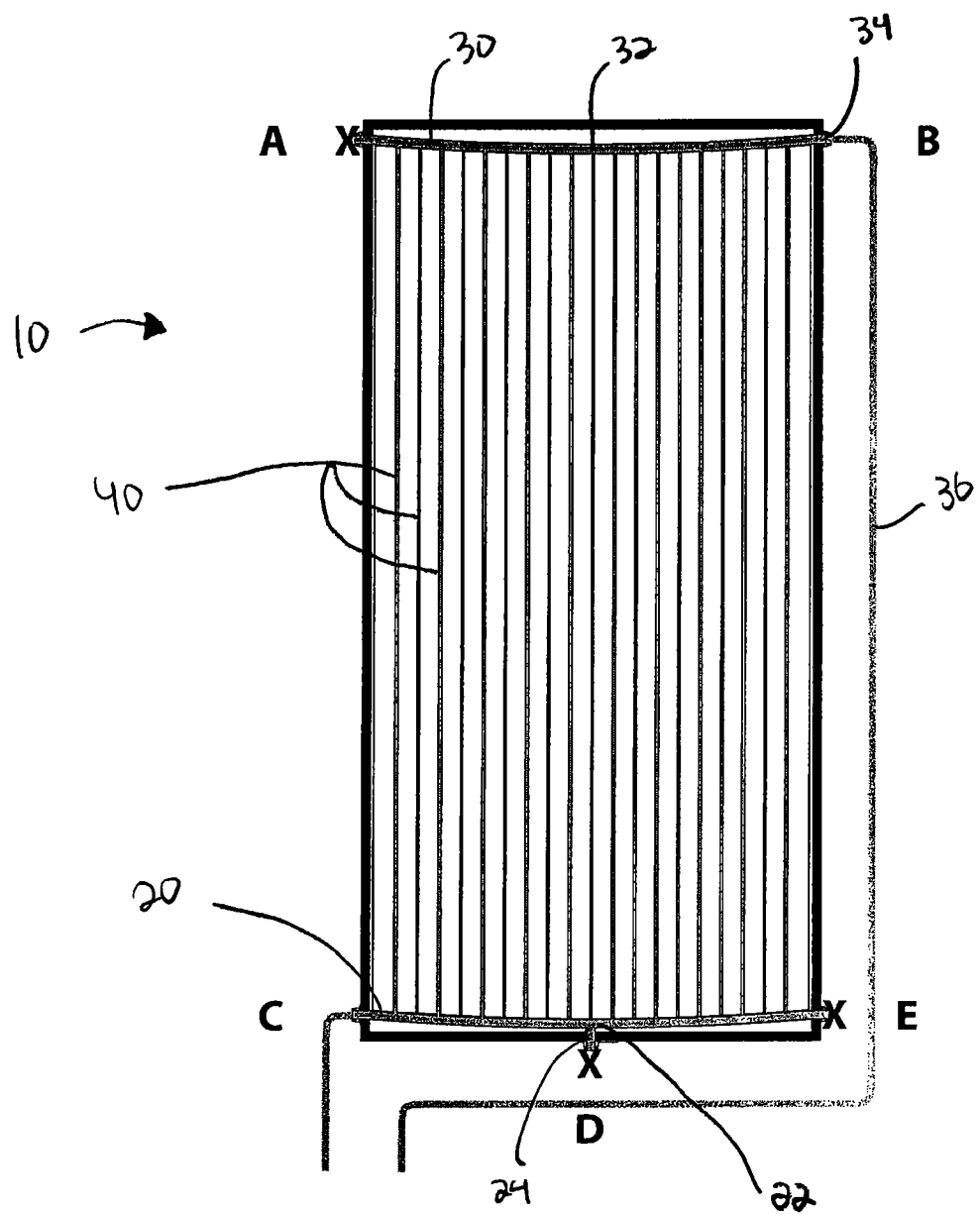
FIG. 3 is a top plan view of another embodiment of a solar collector constructed in accordance with the present invention.

In one embodiment of the solar collector panel 10, such as the embodiment of FIGS. 1 and 3, the first header 20 is a lower header and the second header 30 is an upper header. The designations of "lower" and "upper" refer to the positioning of the respective headers with respect to the solar collector panel 10 and with respect to the slope of the roof or other supporting structure. Accordingly, since the second header 30 will be at a higher elevation than the first header 20, the liquid will have a tendency to drain downwardly toward the first header 20 under the force of gravity when the system is not in use, e.g., when the pump has been deactivated and is no longer forcing fluid through the system.

Generally speaking, the first header 20 and second header 30 are vertically spaced apart from one another. As mentioned above, the first header 20 and second header 30 are in the form of tubes or pipes that convey liquid, e.g., water or glycol, to be heated by the solar collector panel 10. The first header 20 and second header 30 are connected by one or more longitudinal riser tubes 40, which allow liquid to flow between the first header 20 and the second header 30. As shown in FIG. 1, a plurality of riser tubes 40 are spaced apart along the respective lengths of the first header 20 and the second header 30. The interior volume of the solar collector panel 10 is sealed so that, as liquid is circulated through solar collector panel 10 by passing through first header 20, riser tubes 40 and second header 30, the liquid is heated by thermal energy within the interior of the solar collector panel 10. When assembled, the first header 20, the second header 30 and the riser tubes 40 combine to form a footprint that is generally the same size as a solar collection panel with which the solar collector 10 is being used. The solar collector 10 may be one integral unit, or it may be constructed of separate components that are secured together, e.g., by welds.

In order to facilitate draining of the liquid, the first header 20 has a low point 22 along its length (relative to the surface, e.g., the roof, upon which the solar collector panel 10 is supported) toward which the liquid in the first header 20 naturally flows under the force of gravity. In one embodiment, the first header 20 is arcuate in shape. As shown in FIG. 1, the first header 20 may be curved such that the low point 22 of the first header 20 is located near the middle of the first header 20. In such a configuration, liquid will flow from the ends of the first header 20 toward the low point 22 under the force of gravity, which will allow the liquid to drain from a port 24 near the low point 22. It should be noted that the low point 22 may be positioned other than near the middle of the first header 20—it could occur at any point along the length of the first header 20.

Because the first header 20 has a low point 22, the solar collector 10 can be aligned with a horizontal axis. In other words, the solar collector 10 does not need to be rotated or angled with respect to a horizontal axis in order for liquid to drain out of the solar collector 10, thus decreasing the complexity of installation and resulting in a more desirable aesthetic appearance. For example, the first header 20 and second header 30 are positioned so that they extend generally along a horizontal axis. In the instance where a header is curved, such as the first header 20 in FIG. 1, the positioning of the first header with respect to a horizontal axis may be determined by comparing a longitudinal axis of the first header, e.g., one that runs through both end points of the first header 20, and comparing with the horizontal axis. Additionally, in such a configuration, the riser tubes 40 may be positioned so that they are substantially perpendicular to the horizontal axis, i.e. vertically.

Similar to the first header 20 as described above, the second header 30 may also be arcuate in shape. Accordingly, as liquid moves through the second header 30 toward the low point 32 of the second header 30, gravity will force the liquid downwardly through the riser tubes 40. The liquid collects in the first header 20, where can flow toward the low point 22 and out of the port 24.

In many instances, a series of solar panels will be placed in a side-by-side array on a roof or other supporting structure. Accordingly, such solar collection systems will incorporate a plurality of solar collectors 10. For example, a solar collection system with multiple solar panels may have one solar collector 10 for each solar panel in the system. In such an arrangement, the solar collectors 10 are arranged such that the respective headers are substantially aligned along a horizontal axis, and such that the first headers and second headers are respectively aligned with one another. See, e.g., headers 20 and 30 in FIG. 2. Moreover, the respective riser tubes 40 are positioned substantially perpendicular to the horizontal axis, i.e. vertically.

Figure 2:
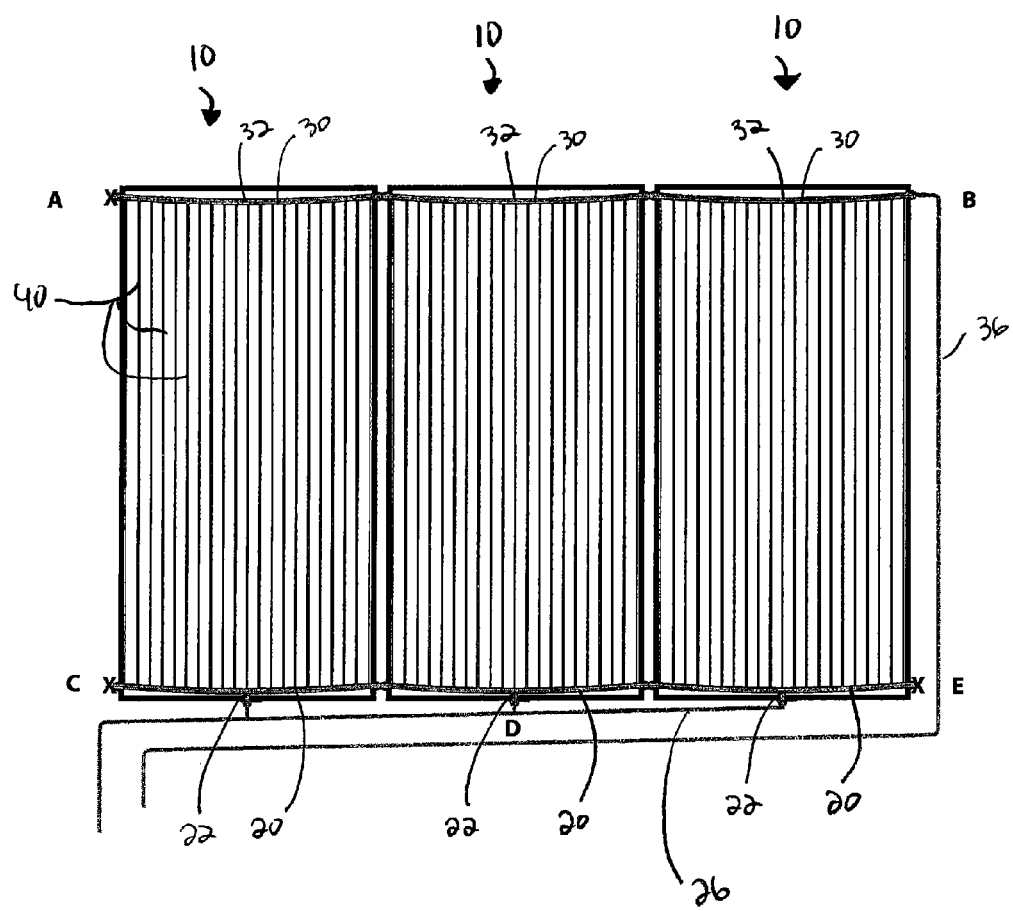
FIG. 2 is a top plan view of a solar collection system including a plurality of solar collectors of FIG. 1.

In the multiple solar collector system shown in FIG. 2, each solar collector 10 has a first header 20—in this embodiment the first header 20 is arcuate in shape as described above—and defines a low point 22. Each first header 20 has a port 24 near each low point 22, and each port 24 communicates with a tube or pipe 26.

Referring to FIG. 2, each solar collector 10 has a plurality of riser tubes 40 that are connected to the first header 20 on one end and to a second header 30—in this embodiment the second header 30 is also arcuate in shape as described above—on the other. Each of the second headers 30 communicates with an adjacent second header 30, with one of the second headers 30 connected to a tube or pipe 36 that enables fluid, e.g., after it has been heated, to exit the solar collector 10 and enter the fluid circulation system.

In the embodiment of FIG. 1, in which solar collector panel 10 is employed in a drain-back circulation system, fluid is pumped through tube 26, into the first header 20, and through the riser tubes 40 so that the fluid may be heated by the solar collector system contained within the solar collector panel 10. The fluid is then supplied to second header 30, and is forced under the pressure of the pump through second header 30 and is discharged through a port 34 for supply to the fluid circulation system. When the pump is deactivated, the fluid flows from second header 30 back down through the riser tubes 40 under the force of gravity. The fluid then flows into the first header 20 and toward the respective low point 22 of the first header 20, where the fluid then enters the tube 26 and flows back into the fluid circulation system.

In a multiple panel drain-back system as shown in FIG. 2, the fluid is pumped through the tube 26 to the first headers 20 so that it flows upwardly through the riser tubes 40, where it is heated by the solar collection system contained within each solar collector panel 10. The heated fluid is then pumped into and through the second headers 30. The second headers 30 have ports 34 that are connected together, with the endmost port 34 being connected to an output tube or pipe 36 through which the heated fluid flows. When the pump of the drain-back system is deactivated, the fluid drains from the solar collector 10 in the manner described above, i.e., it flows downwardly through the riser tubes 40 and to the first headers 20 under the force of gravity, where the fluid then flows toward the low points 22 and out of the ports 24 into the tube 26 and back into the fluid circulation system.

It can thus be appreciated that the present invention provides a construction in which one or more fluid-circulating solar panels can be used in a drain-back circulation system, in which the panels can be positioned horizontally without the need to tilt or skew the panels to provide a low point at the end of the panel or array of panels. Each panel has a fluid circulation system that includes an internal low point within the panel, which allows each panel to drain completely on its own when pump pressure is relieved.

Figure 4:
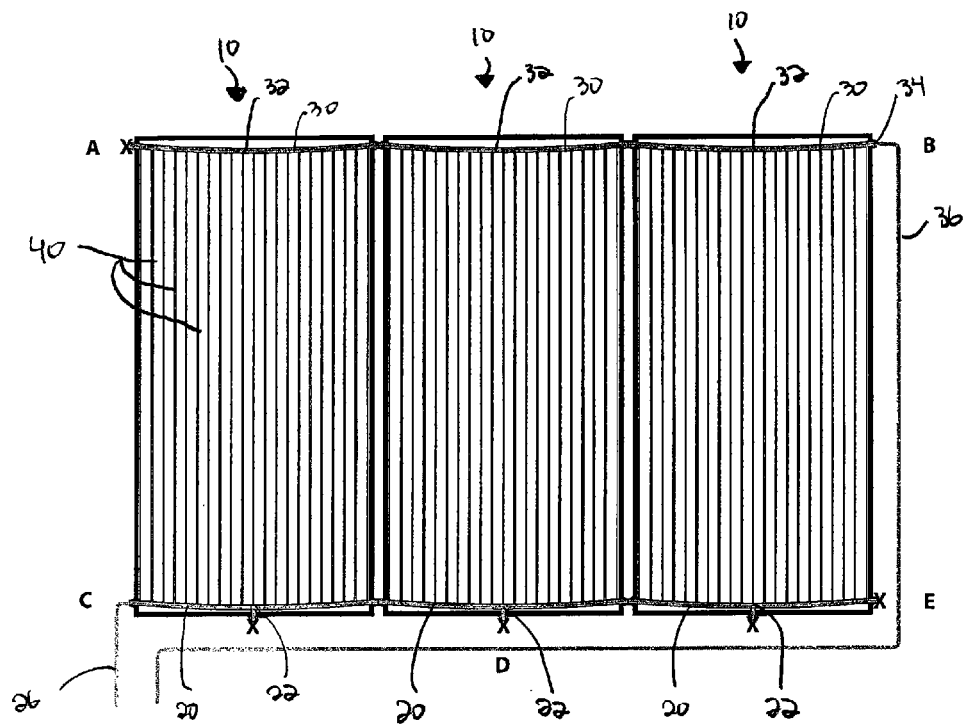
FIG. 4 is a top plan view of a solar collection system including a plurality of solar collectors of FIG. 3.

In another example, the solar collector 10 may be incorporated into a pressurized system (also called a closed loop system). In such an application, the advantages offered by the internal low point of the circulation system are not necessary, since the panels typically do not drain when pump pressure is relieved. For example, the embodiments of FIGS. 3 and 4 show the solar collector 10 in a pressurized system. In a pressurized system such as this, the liquid is typically in the form of glycol so as to ensure that the liquid does not freeze.

The present invention further includes a method for installing one or more solar collectors 10 of the present invention. One embodiment of the method includes the steps of (a) providing a solar panel having a first header having a low point a second header; and a riser tube that communicates with the first header and the second header; and (b) positioning the solar collector so that the first header and second header extend along a horizontal axis. Further steps may include connecting a fluid circulation system to a port at the low point of the first header to facilitate drainage of liquid from the solar collector. A still further step may include providing a plurality of solar collectors and mounting them such that the headers of each of the solar collectors extend along a horizontal axis, and such that the respective first headers and second headers are aligned with one another.

Various alternatives and modifications are contemplated as being within the scope of the following claims particularly pointing out and distinctly claiming the subject matter regarded as the invention.

What is claimed is:

1. A solar collector array comprising:
a plurality of interconnected solar collectors, wherein each solar collector includes:
a housing;
a first header contained within the housing that extends along a horizontal axis and defines a low point within the housing, the low point being positioned between a first port and a second port located at respective ends of the first header, the first port and the second port extending through the housing and being configured to fluidly connect the first header of a respective solar collector to adjacent solar collectors;
a second header that includes a third port and a fourth port at generally opposite longitudinal ends of the second header and configured to fluidly connect the second header of the respective solar collector to adjacent solar collectors; and
a plurality of riser tubes communicating with the first header and the second header;
wherein the first headers of the solar collectors extend along the horizontal axis; and
wherein the low point within the housing of the first header of each solar collector is connected to a fluid circulation tube such that fluid contained within the second header and the plurality of riser tubes is able to drain from each solar collector into the fluid circulation tube through the low point of the first header of each solar collector.

2. The solar collector array of claim 1, wherein the first headers of the solar collectors are interconnected together.

3. The solar collector array of claim 2, wherein the first header of each solar collector has an arcuate configuration and wherein the low point of each first header is located near the center of the first header.

4. The solar collector array of claim 3, wherein the second header of each solar collector has an arcuate configuration and defines a low point located near the center of the second header.

5. The solar collector array of claim 1, wherein the first port of each first header of each of the solar collectors defines an inlet and the second port of each first header of each of the of the solar collectors defines an outlet, and wherein the inlets and outlets of the first headers of adjacent solar collectors are connected together and are oriented so as to extend along the horizontal axis with an upper horizontal edge and a lower horizontal edge of each interconnected solar collector being aligned.

6. The solar collector of claim 1, wherein the first header has an arcuate configuration.

7. The solar collector of claim 6, wherein the low point is located near the middle of the first header.

8. The solar collector of claim 7, wherein the first header is a lower header and the second header is an upper header.

9. The solar collector of claim 8, wherein the one or more riser tubes comprises a plurality of riser tubes that are spaced apart from one another along the length of the first and second headers.

10. The solar collector of claim 9, wherein the second header has an arcuate configuration.

\* \* \* \* \*